(12) United States Patent
Gripemark

(10) Patent No.: US 7,258,210 B2
(45) Date of Patent: Aug. 21, 2007

(54) BALANCED SUPPORT OF BRAKE PADS

(75) Inventor: Joakim Gripemark, Helsingborg (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/077,339

(22) Filed: Mar. 10, 2005

(65) Prior Publication Data

US 2005/0211510 A1    Sep. 29, 2005

Related U.S. Application Data

(63) Continuation of application No. PCT/EP03/09933, filed on Sep. 8, 2003.

(30) Foreign Application Priority Data

Sep. 10, 2002 (SE) .................................. 0202675

(51) Int. Cl.
*F16D 65/10* (2006.01)

(52) U.S. Cl. ..................... 188/218 XL; 188/18 A; 188/73.1; 188/250 R; 188/73.45

(58) Field of Classification Search .............. 188/73.1, 188/250 B, 250 R, 218 XL, 18 A, 73.45, 188/73.32, 71.5
See application file for complete search history.

(56) References Cited

U.S. PATENT DOCUMENTS 3,245,500 A * 4/1966 Hambling et al. .......... 188/72.6
3,964,580 A * 6/1976 Hahm et al. ................ 188/73.1
4,085,828 A * 4/1978 Thioux ....................... 188/71.6
4,219,105 A * 8/1980 Delaunay .................. 188/73.38
4,265,342 A * 5/1981 Karasudani ............... 188/73.32
4,333,550 A * 6/1982 Shirai ......................... 188/72.2
4,775,033 A   10/1988 Heibel ....................... 188/73.43
4,914,801 A * 4/1990 Sweetmore et al. ....... 29/469.5

FOREIGN PATENT DOCUMENTS

| DE | 3803069 A1 | 3/1989 |
|---|---|---|
| EP | 1225366 A2 | 7/2002 |
| FR | 2406755 | 5/1979 |
| FR | 2539475 | 7/1984 |
| GB | 852282 | 10/1960 |
| JP | 05209640 | 8/1993 |
| JP | 2001132782 | 5/2001 |
| JP | 2001304310 | 10/2001 |

OTHER PUBLICATIONS

International Search Report, Dec. 12, 2003, 2 pages.

* cited by examiner

*Primary Examiner*—Devon C. Kramer
*Assistant Examiner*—Mariano Sy
(74) *Attorney, Agent, or Firm*—St. Onge Steward Johnston & Reens LLC

(57) ABSTRACT

A disc brake comprising a caliper, one or more brake discs and one or more brake pads. The brake pads are received on back plates or other pad support. The caliper and the pad supports are designed to take up resulting re-action forces during braking in a plane perpendicular to a contact surface between the caliper and each pad support.

10 Claims, 4 Drawing Sheets

BALANCED SUPPORT OF BRAKE PADS

This application is a continuation of pending International Patent Application No. PCT/EP2003/009933 filed Sep. 8, 2003, which designates the United States and claims priority of pending Swedish Application No. 0202675-5 filed Sep. 10, 2002.

FIELD OF THE INVENTION

The present invention refers to a disc brake and more specifically means to give the brake pads a balanced support. The principals of the present invention may be used irrespectively of the number of brake discs and co-operating brake pads.

PRIOR ART

The present invention is directed to but not limited to brakes having fixed calipers.

The brake pads are normally arranged on back plates or other pad supports, which are received in a caliper, or other means having the same function. During braking a friction force, induced by the clamping brake force between brake pads and the brake disc(s), is transferred to the caliper or the like. The friction force is taken up as a reaction force in the surfaces of contact between pad support(s) and caliper or the like producing a braking torque on the disc(s).

The friction force has normally both horizontal and vertical components, which may be summarised as one force having a certain direction and certain magnitude. The direction and magnitude being the sums of the different components of the friction force.

The ideal situation during braking is that the resulting reaction force caused by braking torque is taken up in one plane perpendicular to the contact area between the pad supports and the caliper or other type of holder. Furthermore, the resulting reaction force should be totally balanced meaning that the resulting reaction force is positioned within the height of the contact area between the pad support and the caliper. That means that the reaction force will be transferred from the pad support directly down into the caliper, without giving any rotating tendency for the pad support. Whenever the brake pad is not totally balanced it will have a tendency to rotate during braking. Said rotating may be in either direction, depending on the actual point of action of the reaction forces. The position of the point of action of the resulting reaction forces varies depending on the distribution of wear, brake force, temperature etc.

The reaction forces and the point of action are due to i.a. the dimensions and designs of the brake pads, pad supports and/or caliper, respectively, and the way in and position at which the brake pads are supported in the caliper.

SUMMARY OF THE INVENTION

One object of the present invention is that the brake pads should be supported in a balanced way. This is done in that the brake is designed to optimise the position of the point of action of the reaction force and that the reaction force is taken up in a single plane. As there in reality are considerable variations of the conditions constituting the optimal situation, there should also be means to accommodate force components not in the desired single plane and point of action.

The present invention concerns a disc brake comprising a caliper, surrounding one or more brake discs and one or more brake pads. Furthermore, a brake actuating mechanism house is attached to the caliper and one or more brake pads are received on back plates or other pad supports and/or in the caliper. The above object is achieved in that the caliper and pad supports are designed to take up summarised reaction forces during braking in a plane perpendicular to a contact area between the caliper and each pad support.

A further object is that the contact pressure between pad support and caliper should be as low as possible. By having a low contact pressure the risk of damages are reduced, giving a reduced risk of malfunction.

Other objects and advantages of the present invention will be obvious for a person skilled in the art when reading the detailed description below of preferred embodiments.

BRIEF DESCRIPTION OF THE DRAWINGS

The invention will be described more closely below by way of examples and with reference to the enclosed drawings. In the drawings.

DETAILED DESCRIPTION OF PREFERRED EMBODIMENTS

Figure 1:
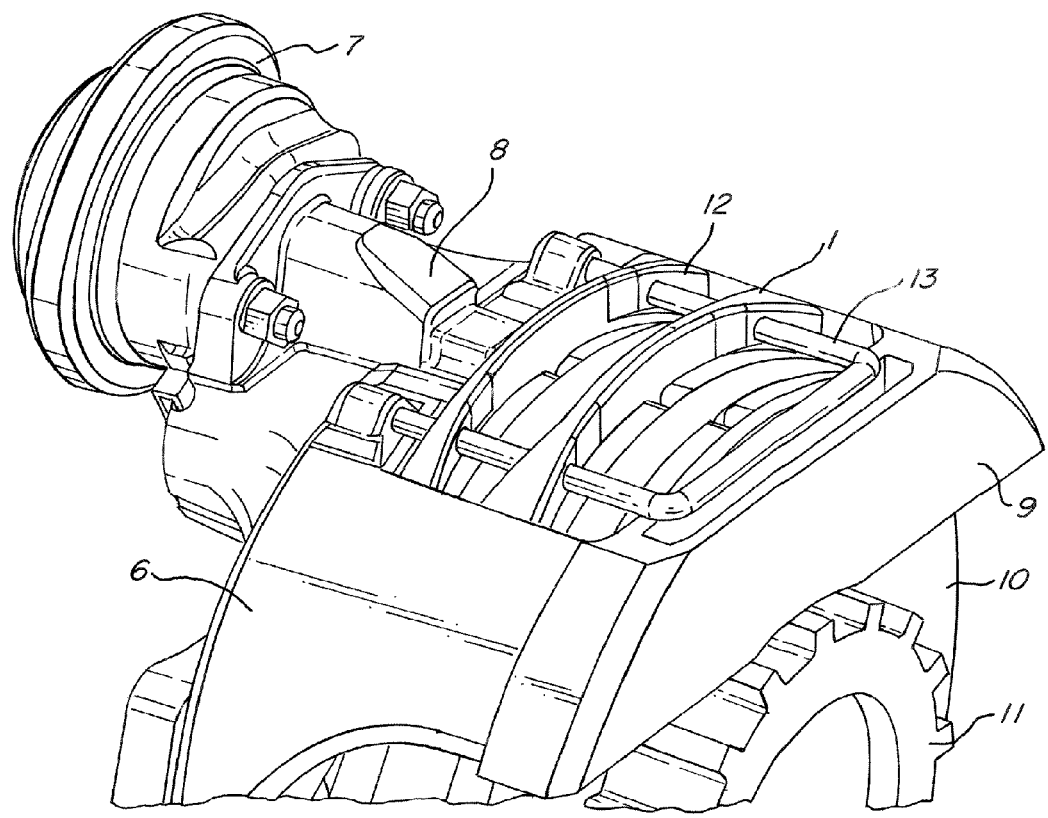
FIG. 1 is a perspective view of an disc brake embracing the present invention.
Figure 2:
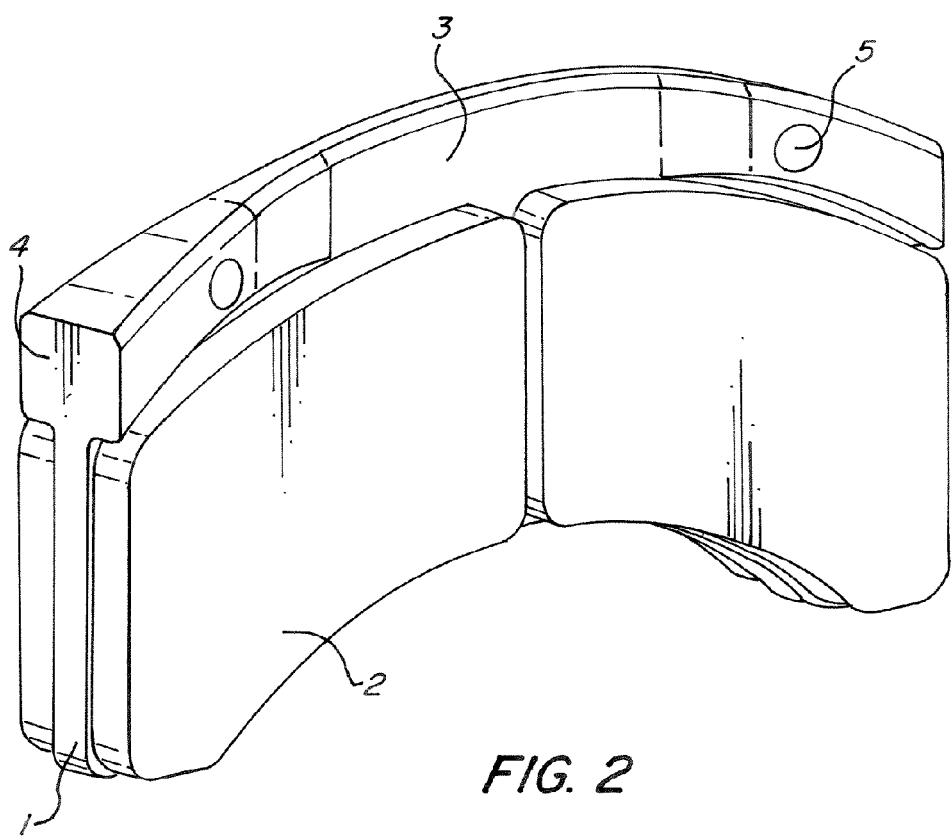
FIG. 2 is a perspective view of a first example of a back plate and brake pads arrangement according to the present invention.
Figure 3:
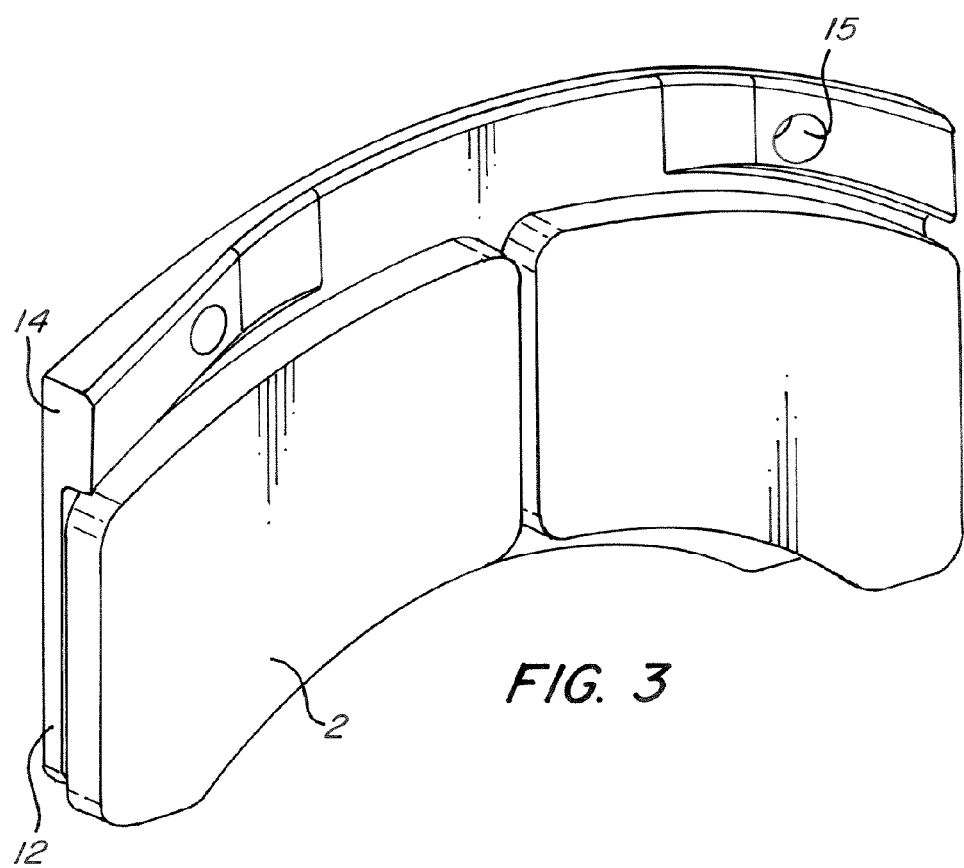
FIG. 3 is a perspective view of a second example of a back plate and brake pads arrangement according to the present invention.

In FIG. 1 an example of a disc brake is shown. The disc brake has a caliper 6, a brake actuator 7, a brake actuating mechanism house 8, back plates 1, 12 and two brake discs 10. In the shown embodiment the brake actuating mechanism house 8 is an integrated part of the caliper 6. The brake actuator 7 is fixed to the brake actuating mechanism house 8. On the side furthest from the brake actuating mechanism house 8 an end plate 9 is fixed to the caliper 6. The brake discs 10 are received on a hub 11 in such a way that the discs 10 are free to slide axially on the hub 11. A person skilled in the art realises that the brake discs 10 may be received in many different ways on the hub 11 to give the axial sliding. In the shown example there are two brake discs 10, but the principal according to the present invention applies also for brakes having other numbers of brake discs 10.

As the exact design of the brake actuator 7 and the brake actuating mechanism house 8 is of no importance for the present invention it will not be described extensively here.

The back plates 1, 12 are furnished with brake pads 2 placed on the sides intended for contact with the brake discs 10. The back plate 1 placed in the middle have brake pads 2 on both sides for co-operation with brake discs 10 on both sides. One back plate 12 with brake pads 2 is placed on the mechanism side for co-operation with one of the brake discs 10. Furthermore, the end plate 9 has recesses (not shown) for receiving brake pads 2, which are to co-operate with one of the brake discs 10. In other embodiments (not shown) a back plate is also placed adjacent the end plate, in which case the brake pads are received on said back plate and not in recesses of the end plate.

For reason of simplicity the brake pads 2 are shown received on back plates 1, 12. However, a person skilled in the art realises that the pads 2 may be received on other types of pad supports and/or that the pads themselves are formed to be directly supported in a caliper or the like. Thus, the expressions "back plate", "pad support", "brake pad" and the like are used interchangeable in some extent in this description. In the same way the expression "caliper" is used in a broad sense and is intended to also cover other means having a similar function.

The back plates 1, 12 are received in a sliding way in an opening of the caliper 6. The ends of the back plates 1, 12 are in contact with the caliper 6 and, thus, a surface of contact, or contact area, is formed between each back plate 1, 12 and the caliper 6. Depending on the direction of rotation of the brake discs 10 a reaction force formed during braking is transferred at one end of each back plate to the caliper 6.

The back plate 1 placed in the middle has an upper part 3 extending above the position of the brake pads 2. The ends of said upper part 3 have an extended area 4 compared to the central part. The extended areas are to be in contact with the caliper 6. The back plate 1 is placed in the caliper 6 in such a way that the end parts 3 will abut edges of an opening in the caliper 6. A part of the reaction forces will be transferred over the contact area between the back plate 1 and caliper 6. In the shown embodiment about half of the braking forces will be transferred via the back plate 1 placed in the middle. Thus, the back plate 1 placed in the middle must be able to take up larger forces than the back plate 12 placed on the mechanism and the end plate 9 of the caliper 6. Also the back plate 12 closest to the mechanism house has an upper part and extended areas 14 for contact with the caliper 6. Said extended areas 14 are directed away from the mechanism house 8, i.e. in the direction towards the centre of the caliper 6.

Due to the extended areas 4, 14 for the contact surfaces between the back plates 1, 12 and caliper 6 the contact pressure will be reduced compared to back plates having no extended area. The extended areas 4, 14 have the form of curvatures seen from above, with the widest part of the curvature at the ends of the back plates 1, 12. Said widest parts are to be in contact with the caliper 6. The extended areas 4, 14 of the back plates 1, 12 have also a curvature form in the radial direction. The outer and inner radii of the extended areas 4, 14 vary, giving the widest part at the ends of the back plates 1, 12. Even though the extended areas are formed as curvatures in the shown examples, a person skilled in the art realises that they may be formed in any way giving extended contact areas.

Ideally the brake forces taken up by the back plates 1, 12 should be taken up in a direction perpendicular to the contact area between the back plates 1, 12 and the caliper 6. Furthermore, the position of the force component should be within the contact area. As long as these conditions apply the back plates 1, 12 will have no tendency to rotate in any direction. If there is any force component not acting perpendicularly to the contact area or if the point of action of the reaction force is placed outside the contact area, the back plates 1, 12 will get a tendency to rotate. The back plates 1, 12 may be given a tendency to either rotate out from the caliper 6 or towards the centre of the brake.

As the ideal conditions as indicated above never can be guaranteed, partly due to the fact that the conditions vary over time depending on the distribution of wear, magnitude of brake force, temperature etc. there must be means to take up brake forces not acting in the desired plan. In the shown embodiment such forces are taken up by means of a clamp 13. The clamp 13 is fixed to the caliper 6 at the mechanism side and goes through two openings 5, 15 in each back plate 1, 12 and has one part resting on and possibly fixed to the end plate 9 of the caliper 6. The clamp 13 is received in openings of the caliper 6 at the mechanism side in the shown embodiment. However, a person skilled in the art realises that any fixation means may be used. In another embodiment a bar replaces the clamp. Said bar is also fixed to the caliper 6 and goes through openings of the back plates 1 and end plate 9, respectively. In an alternative the back plate 12 at the mechanism side has no upper part in the middle and the bar is received on top of the back plate 12. Any tendency for the back plates 1, 12 to rotate will be counteracted by the clamp 13, bar or other suitable means to counteract the rotating tendency.

By designing the brake in a suitable way it is possible to control that the back plates 1, 12 or other type of pad support will only get a tendency to rotate in one direction if the ideal situation is not fulfilled. By such an arrangement one will only have to worry about how to take up forces in one direction. This is done by placing the point of action for the reaction forces in such a position that any normal deviation from the ideal position will give the same direction on the tendency to rotate.

The sizes of the extended areas of the back plates 1, 12 are limited by the size of the opening of the caliper 6 receiving the back plates 1, 12. Furthermore, as the brake pads 2 are worn the space between the back plates 1, 12 are reduced during braking. This also applies for the distance between the end plate 9 and the back plate 1 in the middle. Thus, the maximal size of the extended areas must not exceed a size risking impairing the function of the brake. By placing the back plates 1, 12 in recesses of the end plate 9 there is no need for any back plate on that side. As there is no back plate the size of the opening of the caliper 6 may be reduced, reducing the overall size of the brake. It is a general object for all manufactures to reduce the size of the brakes in order to be able to adapt the brakes to the existing space of different vehicles.

It could generally be said that the wear of the brake pads 2 is proportional to the movement of the brake pad 2 during braking and to the actuation force.

In order to be able to design the caliper, or the like, and the back plates, or other pad support, in such a way that the reaction forces during braking is transferred in one plane, it is important to know where the point of action of the resulting reaction forces is. By means of the relationship below it is possible to establish said point of action for a symmetrical pad configuration and uniform friction force distribution.

$$Heq = \frac{Ry + Ri}{2} \cdot \frac{\alpha}{\sin \alpha}$$

where: Heq is the perpendicular distance from a plane through the centre of a brake disc at which the point of action of the reaction forces should be placed in order for the pad supports to be balanced;

Ry and Ri are the radius from the centre of the brake disc to the outer and inner side, respectively of the brake pad 2; and $\alpha$ is the angle between a line, going through the centre of the brake pad 2 and through the centre of the brake disc, and respective end of the brake pad 2.

Figure 4:
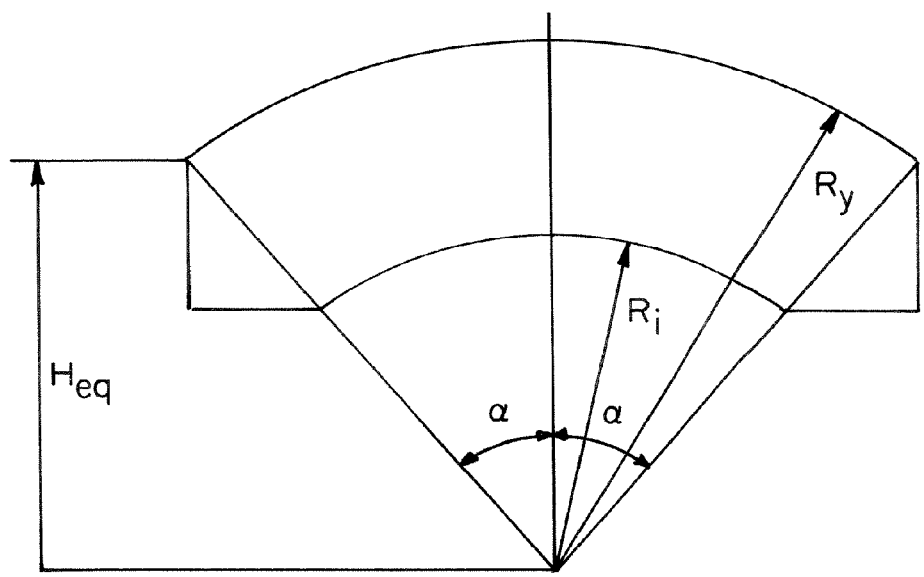
FIG. 4 is a general plan view of a brake pad, showing different quantities.

The above quantities are indicated in FIG. 4.

If the point of action of the reaction forces is placed inside the contact area between the back plates 1, 12 and the direction of the reaction force is perpendicular to the contact area, the back plates 1, 12 are balanced. By "balanced" as used here it is meant that the back plates 1, 12 will get no tendency to rotate in relation to the caliper 6. Thus, by using the relationship it is possible to adapt the caliper 6 in such a way that the surfaces of contact between the back plates 1, 12 and the caliper is placed at an optimised height.

If the above relationship is fulfilled the back plates 1, 12 will be in balance. In case the relationship is not fulfilled the back plates 1, 12 will have a tendency to be turned out of the caliper 6, due to too low contact pressure. The tendency for the back plates 1, 12 to be turned out of the caliper 6 will be reduced if Heq is increased. Thus, the back plates 1, 12 should be supported in a so high position as possible in order to minimise the moment acting to turn the back plates 1, 12 out of the caliper 6. It should be noted that a maximal height, i.e. a maximal Heq, may not be enough and that, thus, the clamp 13 or the like may be needed in order to hinder the back plates 1, 12 from being turned away from the caliper 6. Furthermore, the point of action will move as the pads are worn, due to temperature variations etc. This means a further risk that the point of action in some instances may be placed outside the contact area giving the back plates 1, 12 a tendency to rotate.

The above relationship is one possible way to optimise the position of the point of action of the brake forces. An obvious option is to use similar formulas accommodating for e.g. asymmetrical pad configuration and/or non-uniform friction force distribution. A further and different way to optimise is to try it out experimentally.

What is claimed is:

1. A disc brake comprising a caliper surrounding one or more brake discs and one or more brake pads, and a brake actuating mechanism housing attached to the caliper, characterized in that one or more brake pads are received on back plates or other pad supports and/or in the caliper, that the caliper and pad supports are designed to take up resulting reaction forces during braking in a plane perpendicular to a contact surface between the caliper and each pad support, and that a calculated point of action of the resulting reaction forces is placed inside said contact surface, in order to support the brake pads in a balanced way to prevent any tendency for the pad supports to rotate out from the caliper and to rotate toward the centre of the brake, said calculated point of action of the resulting reaction forces being established by using the following relationship:

$$Heq = \frac{Ry + Ri}{2} \cdot \frac{\alpha}{\sin \alpha}$$

where: Heq is the perpendicular distance in the direction of the brake pad from a plane through the centre of a brake disc, wherein the plane is perpendicular to a line going through the centre of the brake pad, wherein the line is perpendicular to an axis of rotation of the brake disc, at which the resulting reaction forces have their point of action;

Ry and Ri are the radius from the centre of the brake disc to the outer and inner side, respectively, of the brake pad; and α is the angle between a line, going through the centre of the brake pad and through the centre of the brake disc, and respective end of the brake pad.

2. The disc brake of claim 1, characterized in that the pad support(s) is received in an opening of the caliper and that the pad support(s) has extended areas for contact with the caliper.

3. The disc brake of claim 2, characterized in that the extended areas have a curvature form both seen from above and in a radial direction, said curvature form being widest at the ends of the pad supports.

4. The disc brake of claim 2, characterized in that the extended areas of the pad support(s) extend over the brake pads.

5. The disc brake of claim 2, characterized in that the extended areas of the pad supports at the ends of the opening of the caliper only extend towards the "centre" of the caliper.

6. The disc brake of claim 2, characterized by a means to provide support for a horizontal component of the reaction force.

7. The disc brake of claim 6, characterized in that the means to provide support for the horizontal component of the reaction force has the form of a bar received in an opening(s) of the pad support(s), and that each end of the bar is attached to the caliper.

8. The disc brake of claim 7, characterized in that one end of the bar is received in an opening of the caliper and that the other end of the bar is fixed to the caliper by a fixation means.

9. The disc brake of claim 6, characterized in that the means to provide support for the horizontal component of the reaction force has the form of a clamp going through openings in the pad support(s) and are fixed to the caliper.

10. The disc brake of claim 9, characterized in that one or more brake pads are received in recesses of the caliper at the part of the caliper furthest from the brake actuating mechanism housing.

* * * * *